United States Patent [19]

Kitano et al.

[11] Patent Number: 4,720,072
[45] Date of Patent: Jan. 19, 1988

[54] BELT ANCHOR INCORPORATING SEAT TRACK STRUCTURE

[75] Inventors: Tateo Kitano; Masakazu Hashimoto; Yuji Nishiyama, all of Toyota, Japan

[73] Assignee: Toyota Jidosha Kabushiki Kaisha, Japan

[21] Appl. No.: 863,423

[22] Filed: May 15, 1986

[30] Foreign Application Priority Data

May 17, 1986 [JP] Japan .................. 60-73115[U]

[51] Int. Cl.⁴ .................... F16M 13/00; B60R 21/10
[52] U.S. Cl. .................................... 248/429; 297/473
[58] Field of Search ............... 297/473; 248/393, 429, 248/430

[56] References Cited

U.S. PATENT DOCUMENTS

| 3,286,971 | 11/1966 | Walter et al. | 248/429 |
| 4,262,963 | 4/1981 | Bauer et al. | 248/430 |
| 4,482,188 | 11/1984 | Tilly et al. | 297/473 |

FOREIGN PATENT DOCUMENTS 0008957 1/1980 Japan ................................. 297/473

Primary Examiner—James T. McCall
Attorney, Agent, or Firm—Parkhurst & Oliff

[57] ABSTRACT

A belt anchor incorporating seat track structure is employed in an occupant restraining seatbelt system for a vehicle and incorporates a seatbelt anchor for retaining a belt in the seatbelt system. The structure includes a lower rail which is rigidly secured to the vehicle and an upper rail which is movable along the lower rail in the longitudinal direction of the vehicle. A seat of the vehicle is rigidly secured to the upper rail through a lower arm. The structure further includes a lock pin which extends through the lower arm and the lower rail. The load which acts on the belt anchor is transmitted to the lower rail through the pin. In addition, one end portion of the upper rail extends so as to overlap one end portion of the lower rail, so that the load acting on the belt anchor is further transmitted to the lower rail through the overlapping portions. Accordingly, the load which acts on the belt anchor is transmitted to the lower rail while being dispersed and is supported thereby, so that the load is reliably supported by the lower rail even in an emergency situation of the vehicle.

19 Claims, 5 Drawing Figures

BELT ANCHOR INCORPORATING SEAT TRACK STRUCTURE

BACKGROUND OF THE INVENTION

1. Field of the Invention

The present invention relates to a seat track structure employed in an occupant restraining seatbelt system for a vehicle designed to protect an occupant in an emergency situation of the vehicle, the seat track structure incorporating a belt anchor for anchoring the seatbelt to the body of the vehicle.

2. Description of the Related Art

In general, a seat for an occupant of a vehicle is mounted on the floor of the vehicle body through a seat track constituted by a lower rail which is secured to the floor surface and an upper rail which is secured to the seat and adapted to be slidable on the lower rail.

On the other hand, the inner belt of the seatbelt system is secured directly to the floor of the vehicle body without any relation to the seat track. Therefore, the tension generated in the webbing by the inertion acting on the occupant's body when an emergency situation of the vehicle occurs is directly supported by the floor.

There is another conventional arrangement in which the inner belt is secured to the seat so that the webbing can be fastened to the body of the occupant at a constant position at all times regardless of the occupant's adjusting the position of the seat in the longitudinal direction of the vehicle. With this arrangement, however, when an emergency situation of the vehicle occurs, the seat track is subjected to a large load which acts such as to separate the upper and lower rails from each other, and it is therefore necessary to make the seat track more solid.

The lower rail of the seat track is generally bent at the upper end thereof in the horizontal direction, and the upper rail is mounted on the lower rail in such a manner as to cover this bent portion of the lower rail. Therefore, in order to strengthen the seat track, it is necessary to enlarge the width of the seat track, and this leads to a reduction in the leg space for the occupant in the rear seat.

To overcome this problem, a structure has already been proposed in which, despite that the inner belt is secured to the seat, the seat track is not subjected to a large load even when an emergency situation of the vehicle occurs (see, e.g., Japanese Utillity Model Laid-Open No. 257/1985). With this conventional arrangement, however, it is necessary to lay a rail and the like on the vehicle body separately from the seat track, so that the structure is complicated.

SUMMARY OF THE INVENTION

In view of the above-described circumstances, it is a primary object of the present invention to provide a belt anchor incorporating seat track structure which enables a reduction in the width of the rails of the seat track and yet allows an increase in the strength.

To this end, the present invention provides a belt anchor incorporating seat track structure for use in a seatbelt system of a vehicle, which comprises: a seat track having a lower rail rigidly secured to the vehicle and an upper rail movable along the lower rail in the longitudinal direction of the vehicle; a belt anchor secured to the upper rail and adapted to be movable together with the upper rail; a lower arm for rigidly securing the upper rail to a seat of the vehicle; seat retaining means extending through the seat track and the belt anchor and adapted for retaining the seat at a given position in the longitudinal direction of the vehicle and for transmitting the load acting on the belt anchor to the lower arm; and overlapping portions defined by a portion of the upper rail and a portion of the lower rail, said portion of the upper rail extending so as to overlap said portion of the lower rail, the overlapping portions being adapted for transmitting the load acting on the belt anchor to the lower rail.

By virtue of the above-described arrangement, the load which acts on the belt anchor when an emergency situation of the vehicle occurs is not concentrated on the seat track and the belt anchor securing portion but dispersed or distributed to the seat retaining means and the overlapping portions of the upper and lower rails when it is transmittted to the lower rail. Therefore, the load can reliably be transmitted to the body of the vehicle without any fear of the seat track being deformed.

Accordingly, it is not necessary to increase the strength of the seat track by enlarging the dimension of the seat track in the lateral direction of the vehicle.

DESCRIPTION OF THE PREFERRED EMBODIMENT

The belt anchor incorporating seat track structure according to the present invention will be described hereinunder in detail by way of one embodiment.

Figure 1:
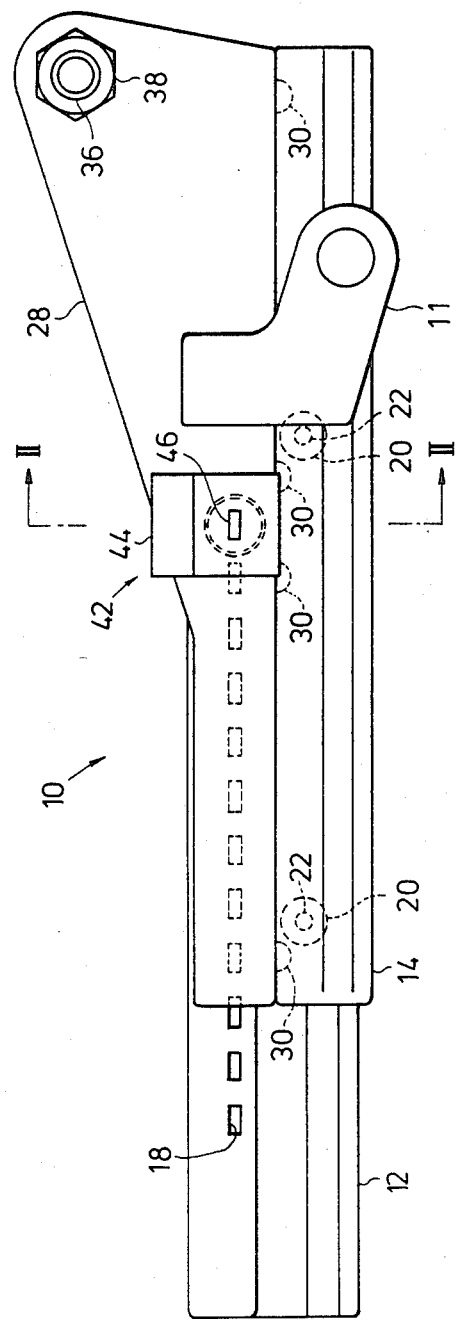
FIG. 1 is a side view of a belt anchor incorporating seat track structure in accordance with one embodiment of the present invention (the lower arm 40 illustrated in FIG. 2 is not shown due to the convenience of description)
Figure 2:
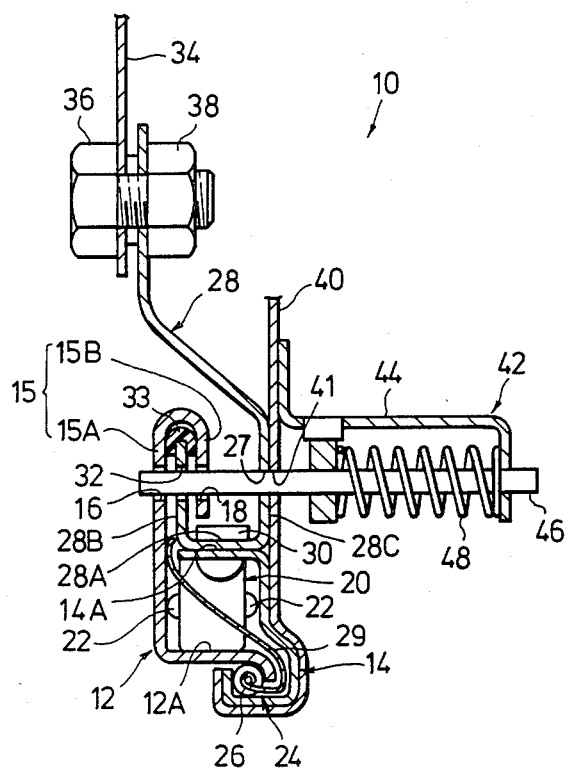
FIG. 2 is a sectional view taken along the line II—II in FIG. 1.

FIGS. 1 and 2 show in combination a seat track 10 in accordance with one embodiment of the present invention.

The seat track 10 has a lower rail 12 which is rigidly secured to the body of a vehicle through a bracket 11 and an upper rail 14 which is rigidly secured to a seat on the vehicle. These rails 12 and 14 are adapted to move relative to each other in the longitudinal direction of the vehicle, thus allowing the seat to move in this direction.

The lower rail 12 is, as shown in FIG. 2, bent so as to have a substantially L-shaped cross-section. The end portion of the upright portion of the lower rail 12 is bent so as to provide a bent portion 15 having a U-shaped cross-section, the distal end of the bent portion 15 facing the floor surface of the vehicle body.

The parallel portions 15A, 15B of the bent portion 15 are respectively provided with a plurality of rectangular bores 16, 18 which are coaxial with each other. The rectangular bores 16, 18 are arranged at appropriate spacings in a direction in which the lower and upper rails 12, 14 move relative to each other.

A plurality of rollers 20 which constitute a part of support means are disposed on the bottom portion 12A of the lower rail 12, the upper rail 14 being supported on the lower rail 12 through the rollers 20.

Hemispherical projections 22 are provided at the axial center on both sides of each of the rollers 20, the projections 22 being brought into contact with the lower and upper rails 12, 14, respectively.

The upper rail 14 is bent in an L-shape in cross-section so as to surround the rollers 20 together with the lower rail 12. The lower end portion of the upper rail 14 is bent in such a manner as to pass around below the bottom portion 12A of the lower rail 12 so as to overlap the lower rail 12. Thus, a space 24 is defined between the upper and lower rails 14, 12 at their overlapping portions.

The space 24 is formed in the shape of a rectangular groove which extends along the longitudinal direction of the vehicle. A plurality of balls 26 which serve as rolling members and which constitute the support means together with the rollers 20 are interposed in the space 24 in such a manner that each of the balls 26 is in contact with all the four inner surfaces of the space 24. The arrangement is such that, when the load which acts on a belt anchor 28 is transmitted to the upper rail 14, this load is transmitted to the lower rail 12 through the balls 26. The balls 26 also serve to prevent occurrence of play or chattering between the lower and upper rails 12, 14 and to enhance the slidability of the upper rail 14 which is mainly offered by the rollers 20.

It should be noted that roller guides 29 are disposed around the rollers 20 and the balls 26 so that these support members are retained in position.

The base portion 28A of the belt anchor 28 which is defined by the intermediate portion thereof is secured to the upper flat portion 14A of the upper rail 14 by means of caulking pins 30.

A pair of parallel leg plates 28B, 28C extend upwardly from the two lateral ends of the base portion 28A. The leg plate 28B is inserted into the area between the parallel portions 15A, 15B of the bent portion 15 of the lower rail 12. A rectangular bore 32 is provided in the end portion of the leg plate 28B so that the bore 32 is coaxial with the rectangular bores 16, 18. In addition, a slide piece 33 is fitted over the distal end of the leg plate 28B, and the parallel portions 15A, 15B clamps the leg plate 28B through this slide piece 33.

The other leg plate 28C is bent at its intermediate portion so that the leg plate 28C as a whole has a substantially S-shaped cross-section. One end of an inner belt 34 is connected to the upper end portion of the leg plate 28C by a combination of a bolt 36 and a nut 38.

The end face of the leg plate 28C of the belt anchor 28 has a triangular shape one of the vertices of which is defined by the end portion thereof which is connected to the inner belt 34. Thus, the load which is transmitted from the inner belt 34 is transmitted to the vehicle body while being dispersed in the longitudinal direction of the vehicle.

It should be noted that the other end of the inner belt 34 is provided with a buckle device and mounted on the upper surface of the seat.

The lower portion of each of the caulking pins 30 which secure the belt anchor 28 to the upper rail 14 has a circular cross-section and is disposed on the locus of movement of the rollers 20.

Accordingly, the range within which the rollers 20 can move is limited by installing the caulking pins 20 at given positions, and the upper rail 14 is thereby prevented from coming off the lower rail 12.

The seat track 10 arranged as detailed above is rigidly secured to the seat through a lower arm 40.

The lower arm 40 is rigidly secured to the upper rail 14 and the belt anchor 28 by appropriate means, e.g., spot welding in such a manner that the lower arm 40 extends vertically along them. In addition, a lock mechanism 42 which serves as a retaining means is mounted on the lower arm 40.

The lock mechanism 42 is rigidly secured to the lower arm 40 through a bracket 44. The lock mechanism 42 has a lock pin 46 and a compression coil spring 48. The lock pin 46 is normally biased by the compression coil spring 48 so as to extend horizontally through a through-hole 41 in the lower arm 40, a through-hole 27 in the belt anchor 28 and the rectangular bores 16, 18, 32. The arrangement is such that, when the occupant actuates a lever (not shown), the lock pin 46 is axially moved against the biasing force from the compression coil spring 48, so that the lock pin 46 can be removed from the rectangular bores 16, 18 and 32. Further, the lower end of the lower arm 40 extends along the upper rail 14 so as to enhance the strength of the overlapping portion of the upper rail 14.

When an emergency situation of the vehicle occurs, the load which acts on the belt anchor 28 is transmitted to the lower arm 40 through the lock pin 46, thereby preventing an excessively large load from acting on the upper rail 14.

The following is a description of the operation of this embodiment.

When the vehicle is in a normal state, the lock pin 46 of the lock mechanism 42 is received through the rectangular bores 16, 18 and 32, and the seat is thereby retained.

To move the seat, the occupant actuates the lever in such a manner that the lock pin 46 is axially moved against the biasing force from the compression coil spring 48 so as to be temporarily removed from the rectangular bores 16, 18 and 32, thereby allowing the upper rail 14 to move relative to the lower rail 12 and thus enabling the occupant to dispose the seat at any desired position. Then, with the lever released, the lock pin 46 is inserted into the ones of the rectangular bores 16, 18 which are located at an appropriate position and the rectangular bore 32.

Since the lower and upper rails 12, 14 are retained by the balls 26, the slide piece 33 and the projections 22 of the rollers 20, the upper rail 14 can slide smoothly without any play or chattering.

When the vehicle runs into an emergency situation, the inertia which acts on the occupant's body causes the belt anchor 28 to be loaded. However, since the belt anchor 28 has the shape of a triangle, one of the vertices of which is defined by the joint between the belt anchor 28 and the inner belt 34, the load which acts on the belt anchor 28 is transmitted to the upper rail 14 while being dispersed in the longitudinal direction of the vehicle, and the load is further transmitted to the lower rail 12 through the balls 26 at the portion of the upper rail 14 which overlaps the lower rail 12. There is therefore no fear of the upper rail 14 being deformed.

In addition, since a part of the load can be transmitted directly to the lower rail 12 through the lock pin 46 which is horizontally received by the lower rail 12, the upper rail 14 is prevented from being heavily loaded. Accordingly, the width of the seat track can be made smaller than that of the conventional seat track, so that it is possible to enlarge the leg space for the occupant in the rear seat.

Figure 3:
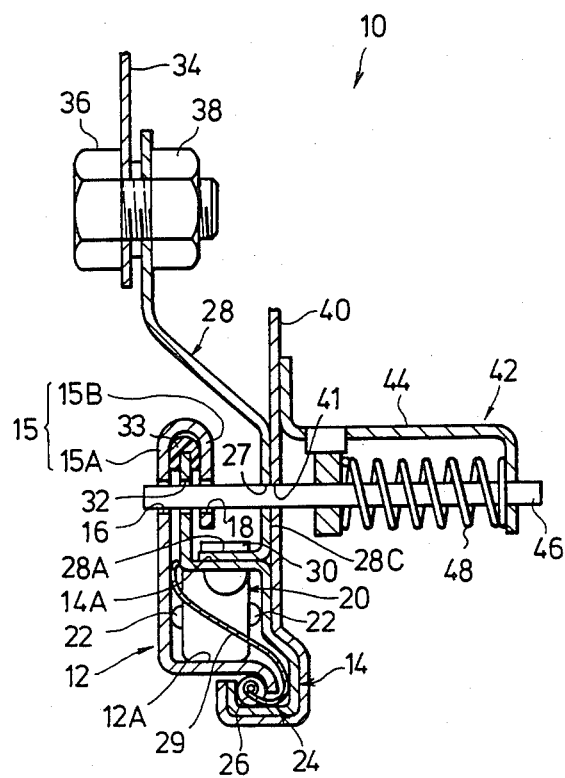
FIG. 3 is a sectional view of the seat track structure in the case where the end portion of the upper rail is disposed within the bent portion of the lower rail.

It should be noted that, although in this embodiment the end portion of the leg plate 28B of the belt anchor 28 is disposed within the bent portion 15 of the lower rail 12, this arrangement is not necessarily limitative. For example, the upper end portion of the upper rail 14 may be extended so as to be disposed within the bent portion 15 as shown in FIG. 3. In such case also, advantageous effects similar to the above can be obtained.

Figure 4:
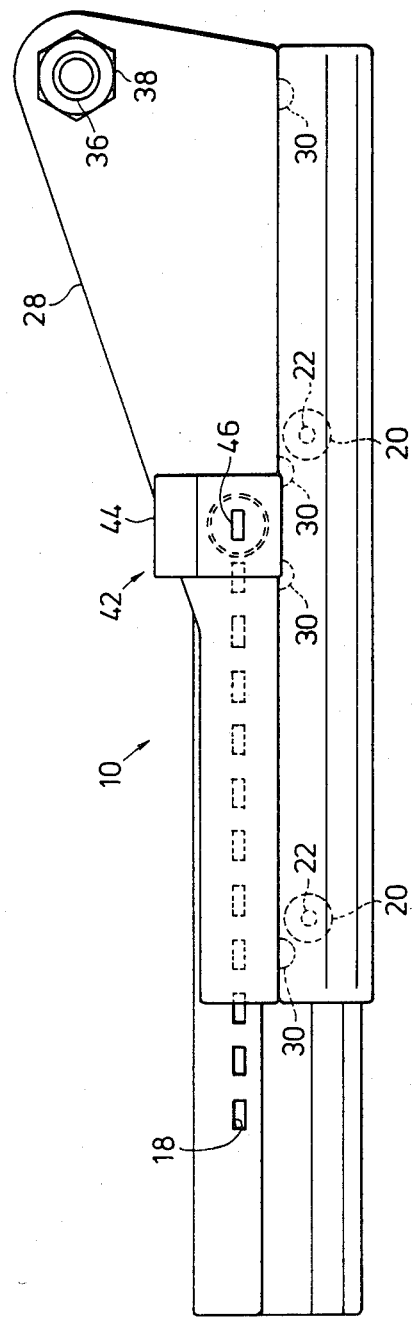
FIG. 4 is a sectional view of the seat track structure in the case where the lower rail is secured directly to the body of the vehicle without using any bracket.
Figure 5:
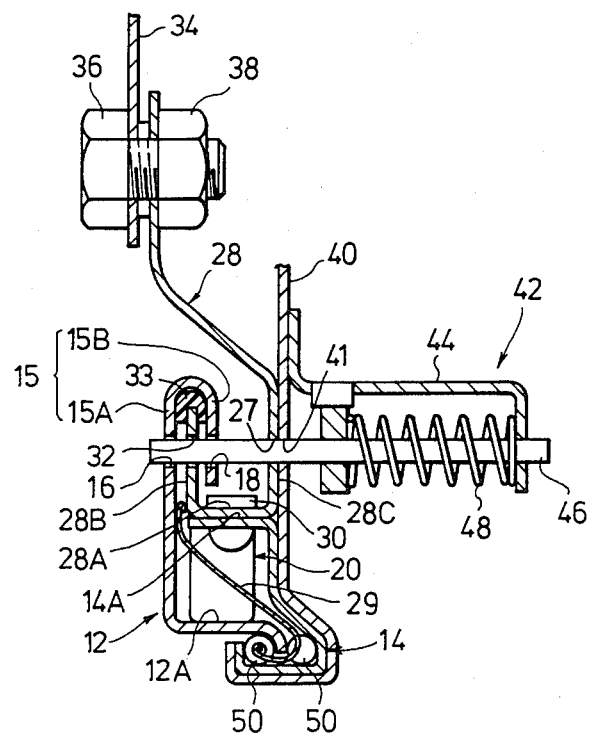
FIG. 5 is a sectional view of the seat track structure in the case where balls are additionally provided between the upper and lower rails and the projections of the rollers are removed.

Although the lower rail 12 is rigidly secured to the vehicle body through the bracket 11 in the above-described embodiment, the lower rail 12 may be secured directly to the vehicle body without using the bracket 11, as shown in FIG. 4.

In addition, it is possible to allow the upper rail 14 to slide even more smoothly by providing balls in addition to the balls 26 in such a manner that two parrellel rows of balls 50 are disposed between the lower and upper rails 12, 14, and by removing the projections 22 from the rollers 20.

As has been described above, the belt anchor incorporating seat track structure according to the present invention comprises: a seat track having a lower rail rigidly secured to the vehicle and an upper rail movable along the lower rail in the longitudinal direction of the vehicle; a belt anchor secured to the upper rail and adapted to be movable together with the upper rail; a lower arm for rigidly securing the upper rail to a seat of the vehicle; seat retaining means extending through the seat track and the belt anchor and adapted for retaining the seat at a given position in the longitudinal direction of the vehicle and for transmitting the load which acts on the belt anchor when an emergency situation of the vehicle occurs to the lower arm; and overlapping portions defined by a portion of the upper rail and a portion of the lower rail, said portion of the upper rail extending so as to overlap said portion of the lower rail, the overlapping portions being adapted for transmitting the load acting on the belt anchor to the lower rail. With this arrangement, it is possible to reduce the rail width of the seat track and enhance the strength of the seat track.

What is claimed is:

1. A belt anchor incorporating a seat track structure for use in a seatbelt system of a vehicle comprising:
   (a) a seat track having a lower rail rigidly secured to the vehicle and an upper rail movable along said lower rail in the longitudinal direction of the vehicle;
   (b) a belt anchor secured to said upper rail and adapted to be movable together with said upper rail;
   (c) a lower arm for rigidly securing said upper rail to a seat of the vehicle;
   (d) seat retaining means having a lock pin extending through said seat track and said belt anchor, and biasing means for biasing said lock pin in said extending direction, and adapted for retaining said seat at a given position in the longitudinal direction of the vehicle and for transmitting the load acting on said belt anchor to said lower arm; and
   (e) overlapping portions defined by a portion of said upper rail and a portion of said lower rail, said portion of upper rail extending so as to overlap said portion of said lower rail, said overlapping portions being adapted for transmitting the load acting on said belt anchor to said lower rail,
   whereby the load which acts on said belt anchor when an emergency situation of the vehicle occurs is transmitted to said lower rail through said seat retaining means and the overlapping portions of said upper and lower rails and reliably supported by said lower rail.

2. A belt anchor incorporating seat track structure according to claim 1, wherein said lower rail is bent so as to have a substantially L-shaped cross-section and is further bent at one end portion thereof so that this portion has a substantially U-shaped cross-section, said lock pin being received through this U-shaped portion.

3. A belt anchor incorporating seat track structure according to claim 2, wherein the other end portion of said lower rail overlaps one end portion of said upper rail.

4. A belt anchor incorporating seat track structure according to claim 3, wherein one end portion of said lower arm extends along said one end portion of said upper rail, thereby reinforcing the overlapping portion of said upper rail.

5. A belt anchor incorporating seat track structure according to claim 4, wherein a rolling member is disposed in a space defined between said overlapping portions of said lower and upper rails, said load being transmitted to said lower rail through said rolling member.

6. A belt anchor incorporating seat track structure according to claim 2, wherein one end portion of said belt anchor is disposed within the U-shaped portion of said lower rail, said lock pin further extending through said one end portion of said belt anchor.

7. A belt anchor incorporating seat track structure according to claim 3, wherein the other end portion of said upper rail is disposed within the U-shaped portion of said lower rail, said lock pin further extending through said the other end portion of said upper rail.

8. A belt anchor incorporating seat track structure according to claim 5, wherein a roller is disposed between said lower and upper rails such that said upper rail is supported by said lower rail through said roller.

9. A belt anchor incorporating seat track structure according to claim 8, wherein said roller has hemispherical projections respectively provided on both sides thereof at the center thereof, said projections being brought into contact with said lower and upper rails, rspectively.

10. A belt anchor incorporating seat track structure according to claim 4, wherein a first rolling member is disposed in a space defined between the overlapping portions of said lower and upper rails, and a second rolling member is disposed in a space defined between the outer side of the distal end of the overlapping portion of said lower rail and said upper rail.

11. A belt anchor incorporating seat track structure employed in an occupant restraining seatbelt system for a vehicle, said structure incorporating a belt anchor for retaining a belt in said seatbelt system, which comprises:
   (a) a seat track having a lower rail which is rigidly secured to the vehicle and an upper rail which is movable along said lower rail in the longitudinal direction of the vehicle;
   (b) said belt anchor rigidly secured to said upper rail and adapted to move together with said upper rail;
   (c) a lower arm rigidly secured to said upper rail and to a seat of the vehicle and adapted to move together with said seat in accordance with the movement of said upper rail;

(d) a lock mechanism extending through said seat track and said belt anchor and adapted to retain said seat at a given position in the longitudinal direction of the vehicle and to transmit the load which acts on said belt anchor to said lower rail; and (e) overlapping portions defined by one end portion of said upper rail and one end portion of said lower rail, said end portion of said upper rail extending so as to overlap said one end portion of said lower rail, said overlapping portion being adapted to transmit the load which acts on said belt anchor to said lower rail, whereby the load which acts on said belt anchor when an emergency situation of the vehicle occurs is transmitted to said lower rail through said lock mechanism and said overlapping portions of said upper and lower rails and reliably supported by said lower rail.

12. A belt anchor incorporating seat track structure according to claim 11, wherein said lock mechanism is secured to said lower arm and includes a lock pin which extends through said lower rail and said belt anchor and a spring for biasing said lock pin in said extending direction.

13. A belt anchor incorporating seat track structure according to claim 12, wherein said lower rail has a plurality of through-holes arranged at appropriate spacings in the direction of movement of said upper rail, said lock pin being received through the one of said through-holes in said lower rail which is located at an appropriate position after said upper rail has been moved relative to said lower rail.

14. A belt anchor incorporating seat track structure according to claim 12, wherein said lower rail is bent so as to have a substantially L-shaped cross-section and is further bent at one end portion thereof so that this portion has a substantially U-shaped cross-section, said lock pin being received through this U-shaped portion.

15. A belt anchor incorporating seat track structure according to claim 13, wherein the other end portion of said lower rail overlaps one end portion of said upper rail.

16. A belt anchor incorporating seat track structure according to claim 14, wherein one end portion of said lower arm extends along said one end portion of said upper rail, thereby reinforcing the overlapping portion of said upper rail.

17. A belt anchor incorporating seat track structure according to claim 15, wherein a rolling member is disposed in a space defined between said overlapping portions of said lower and upper rails, said load being transmitted to said lower rail through said rolling member.

18. A belt anchor incorporating seat track structure according to claim 13, wherein one end portion of said belt anchor is disposed within the U-shaped portion of said lower rail, said lock pin further extending through said one end portion of said belt anchor.

19. A belt anchor incorporating seat track structure according to claim 16, wherein a roller is disposed between said lower and upper rails such that said upper rail is supported by said lower rail through said roller.

* * * * *